United States Patent
Wilk et al.

(10) Patent No.: US 9,836,357 B1
(45) Date of Patent: Dec. 5, 2017

(54) SYSTEMS AND METHODS FOR BACKING UP HETEROGENEOUS VIRTUAL ENVIRONMENTS

(71) Applicant: Veritas Technologies LLC, Mountain View, CA (US)

(72) Inventors: Tomasz Wilk, Longwood, FL (US); Baishen Zhu, Sanford, FL (US); Suren Sethumadhavan, Lake Mary, FL (US); Pu Ou, Longwood, FL (US); Russell Monckton, Longwood, FL (US); Udayan Majumdar, Pune (IN); Sachin Laddha, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 136 days.

(21) Appl. No.: 14/261,808

(22) Filed: Apr. 25, 2014

(51) Int. Cl.
  *G06F 15/167* (2006.01)
  *G06F 11/14* (2006.01)
  *H04L 29/08* (2006.01)

(52) U.S. Cl.
  CPC ...... *G06F 11/1464* (2013.01); *H04L 67/1097* (2013.01)

(58) Field of Classification Search
  None
  See application file for complete search history.

(56) References Cited

U.S. PATENT DOCUMENTS

| | | | |
|---|---|---|---|
| 7,774,391 B1 * | 8/2010 | Le | G06F 17/30091 707/822 |
| 8,850,146 B1 | 9/2014 | Majumdar | |
| 9,176,889 B1 * | 11/2015 | Earhart, III | G06F 12/10 |
| 2005/0165867 A1 | 7/2005 | Barton et al. | |
| 2007/0277010 A1 | 11/2007 | Anand et al. | |
| 2008/0270670 A1 | 10/2008 | Usami | |
| 2009/0327628 A1 | 12/2009 | Narayanan et al. | |
| 2010/0030983 A1 | 2/2010 | Gupta et al. | |
| 2010/0070725 A1 * | 3/2010 | Prahlad | G06F 11/1453 711/162 |
| 2011/0010515 A1 | 1/2011 | Ranade | |

(Continued)

OTHER PUBLICATIONS

"Veeam® ", http://www.veeam.com/, as accessed Nov. 14, 2012, (Aug. 21, 2006).

(Continued)

*Primary Examiner* — Hamza Algibhah
*Assistant Examiner* — John Fan
(74) *Attorney, Agent, or Firm* — FisherBroyles LLP

(57) ABSTRACT

The disclosed computer-implemented method for backing up heterogeneous virtual environments may include (1) identifying a request to back up a virtual machine executing on a host system, (2) creating a storage map of a virtual storage environment of the virtual machine by (a) identifying, from the host system, a virtual disk file that stores data for the virtual machine and (b) identifying, from a guest system operating within the virtual machine, one or more virtual storage devices that store data for the virtual machine, and (3) creating a unified backup of the virtual machine based on the storage map of the virtual storage environment by coordinating a backup operation of the virtual disk file with a backup operation of the virtual storage device. Various other methods, systems, and computer-readable media are also disclosed.

18 Claims, 7 Drawing Sheets

(56) References Cited

U.S. PATENT DOCUMENTS

| | | | |
|---|---|---|---|
| 2011/0202735 A1 | 8/2011 | Kono et al. | |
| 2012/0084262 A1* | 4/2012 | Dwarampudi | G06F 11/1448 707/667 |
| 2012/0290802 A1 | 11/2012 | Wade et al. | |
| 2014/0189685 A1* | 7/2014 | Kripalani | G06F 8/65 718/1 |

OTHER PUBLICATIONS

"AppAssure", http://www.appassure.com/, as accessed Nov. 14, 2012, (Jul. 30, 2003).

"CommVault", http://www.commvault.com/, as accessed Nov. 14, 2012, (Dec. 2, 1998).

"Avamar", http://www.emc.com/data-protection/avamar.htm, as accessed Nov. 14, 2012, (on or before Nov. 14, 2012).

"Tivoli", http://www-01.ibm.com/software/tivoli/, as accessed Nov. 14, 2012, (May 31, 2008).

"HP Data Protector", http://www8.hp.com/us/en/software-solutions/data-protector-backup-recovery-software/, as accessed Nov. 14, 2012, (on or before Nov. 14, 2012).

Mohit Jha; Systems and Methods for Applying Storage Lifecycle Policies to Backups; U.S. Appl. No. 13/493,474, filed Jun. 11, 2012.

Srineet Sridharan, et al; Systems and Methods for Backing Up Virtual Machine Data; U.S. Appl. No. 13/763,163, filed Feb. 8, 2013.

Shweta Goyal, et al; Systems and Methods for Sending Information to Guest Systems Within Virtual Machines; U.S. Appl. No. 13/748,556, filed Jan. 23, 2013.

Ynn-Pyng Tsaur, et al; Systems and Methods for Simplifying Data Restoration Using Resource Types; U.S. Appl. No. 13/650,054, filed Oct. 11, 2012.

* cited by examiner

SYSTEMS AND METHODS FOR BACKING UP HETEROGENEOUS VIRTUAL ENVIRONMENTS

BACKGROUND

The need to back up important data has long been a concern of computing system administrators. Data backup was relatively simple in the days of mainframe computers. Data was often stored in a central data center, where it could easily be backed up to secondary storage, usually tape. The picture changed as personal computers became the dominant computing system and important data began to be distributed among many personal computers throughout an organization. Information system administrators were often faced with the difficult tasks of trying to educate and persuade personal computer users of the need and the procedures for data backup, as well as trying to make the backup process as simple and automatic as possible.

Recent trends are leading back to data centralization, particularly with the implementation of cloud computing systems. Large data centers may house various types of servers and data storage devices with almost incomprehensible capacity that may serve millions of users either individually or as part of one or more organizations. Despite the trend toward data centralization, the data backup task is more complex than ever. A primary complicating factor is the use of virtual machines. Virtual machines may be quickly and easily set up and reconfigured according to the immediate need, but have all but erased the relationship between the computer and physical storage devices.

From the point of view of a host system, a virtual machine may connect to one or more virtual disk files that house a representation of virtual disks accessed by the virtual machine. Backing up virtual machine data may at first appear to be a simple matter of backing up the virtual disk files. However, in some cases, a guest system that operates within a virtual machine may have a very different, more heterogeneous, view of the storage devices available for its use. For example, a virtual machine may share a virtual disk file with another virtual machine, or the guest system may access various types of storage area networks, virtual storage clusters, or application server data stores, all outside the view of the host system.

Accordingly, the instant disclosure identifies and addresses a need for additional and improved systems and methods for backing up heterogeneous virtual environments.

SUMMARY

As will be described in greater detail below, the instant disclosure describes various systems and methods for backing up heterogeneous virtual environments by mapping the various data stores used by a virtual machine, including both the virtual disk file(s) that represent virtual disks for the virtual machine and the various other data stores used by the virtual machine. These systems and methods may then perform a unified backup for the virtual machine by coordinating the backup of the virtual disk file(s) and the heterogeneous data stores, according to the storage map.

In one example, a computer-implemented method for backing up heterogeneous virtual environments may include (1) identifying a request to back up a virtual machine executing on a host system, (2) creating a storage map of a virtual storage environment of the virtual machine by (a) identifying, from the host system, a virtual disk file that stores data for the virtual machine and (b) identifying, from a guest system operating within the virtual machine, one or more virtual storage devices that store data for the virtual machine, and (3) creating a unified backup of the virtual machine based on the storage map of the virtual storage environment by coordinating a backup operation of the virtual disk file with a backup operation of the virtual storage device.

In one embodiment, the virtual storage device may not be identified as pertaining to the virtual machine independently of the guest system. In one embodiment, the virtual storage device may include (1) a shared virtual disk file, (2) a pass-through data store, (3) an independent disk, (4) a storage area network, (5) a virtual server cluster, and/or (6) a virtual application data store. In one embodiment, the storage area network may include (1) a data store on a Fibre Channel network and/or (2) a data store on a logical Internet Small Computer System Interface device.

In some examples, identifying the virtual storage device that stores data for the virtual machine may include (1) discovering the hostname of the virtual machine, (2) using the hostname to connect to the guest system operating within the virtual machine, and (3) querying the guest system to identify the virtual storage device. In some examples, identifying the virtual storage device that stores data for the virtual machine may include (1) discovering the hostname of the virtual machine and (2) using the hostname to query a virtual machine management interface to identify the virtual storage device.

In one embodiment, the backup operation of the virtual disk file may include (1) snapshotting the virtual disk file, (2) copying the virtual disk file, and/or (3) creating a device image of the storage device containing the virtual disk file. In some examples, backing up the virtual storage device may include (1) using the virtual machine hostname to connect to the guest system operating within the virtual machine and (2) directing the guest system to back up the virtual storage device. In some examples, backing up the virtual storage device may include (1) identifying a maximum backup time difference objective to maintain data consistency between a backup of the virtual disk file and a backup of the virtual storage device and (2) backing up the virtual disk file and the virtual storage device within the maximum backup time difference objective. Additionally or alternatively, creating the unified backup of the virtual machine may include creating a point-in-time backup of the virtual machine by (a) creating a backup of the virtual disk file at a point in time, (b) creating a backup of the virtual storage device at the point in time, and (c) associating the backup of the virtual disk file with the backup of the virtual storage device under the unified backup.

In one embodiment, a system for implementing the above-described method may include one or more modules stored in memory, including (1) an identification module that identifies a request to back up a virtual machine executing on a host system, (2) a mapping module that creates a storage map of a virtual storage environment of the virtual machine by (a) identifying, from the host system, a virtual disk file that stores data for the virtual machine and (b) identifying, from a guest system operating within the virtual machine, a virtual storage device that stores data for the virtual machine, (3) a backup module that creates a unified backup of the virtual machine based on the storage map of the virtual storage environment by coordinating a backup operation of the virtual disk file with a backup operation of the virtual storage device, and (4) at least one physical processor that executes the identification module, the mapping module, and the backup module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a request to back up a virtual machine executing on a host system, (2) create a storage map of a virtual storage environment of the virtual machine by (a) identifying, from the host system, a virtual disk file that stores data for the virtual machine and (b) identifying, from a guest system operating within the virtual machine, a virtual storage device that stores data for the virtual machine, and (3) create a unified backup of the virtual machine based on the storage map of the virtual storage environment by coordinating a backup operation of the virtual disk file with a backup operation of the virtual storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
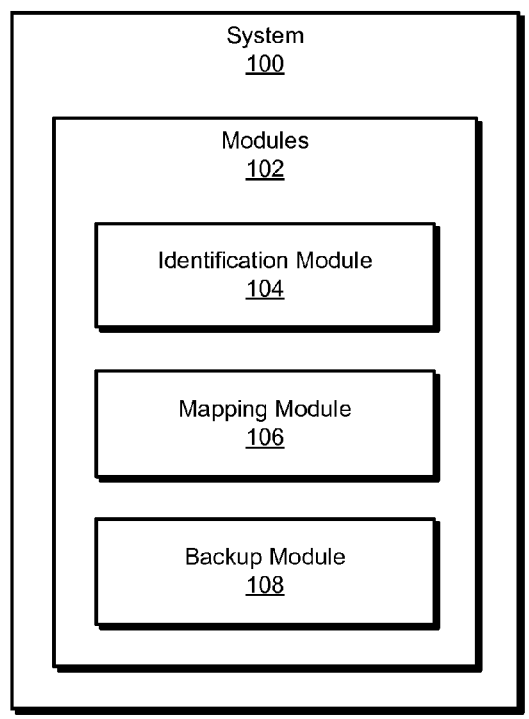
FIG. 1 is a block diagram of an exemplary system for backing up heterogeneous virtual environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for backing up heterogeneous virtual environments. As will be explained in greater detail below, the systems and methods described herein may back up heterogeneous virtual environments by identifying the various data stores used by a virtual machine, including the virtual disk file(s) and virtual storage devices that may be known to the virtual machine, but not to the host system. By mapping the virtual storage environment and backing up the various virtual storage devices used by the virtual environment according to the storage map, the systems and methods described herein may create a unified backup of the entire virtual storage environment. By creating a unified backup, the consistency and integrity of data stored across the various storage devices from the view of a guest system of a virtual machine may be maintained. In addition, in some examples, these systems and methods may facilitate a simple and reliable way of backing up an entire host system for virtual machines (e.g., by selectively performing and coordinating host-based and guest-based backups of virtual machines on the host system).

The following will provide, with reference to FIGS. 1, 2, 4, and 5, detailed descriptions of exemplary systems for backing up heterogeneous virtual environments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for backing up heterogeneous virtual environments. As illustrated in this figure, exemplary system 100 may include one or more modules 102 for performing one or more tasks. For example, and as will be explained in greater detail below, exemplary system 100 may also include an identification module 104 that may identify a request to back up a virtual machine executing on a host system. Exemplary system 100 may additionally include a mapping module 106 that may create a storage map of a virtual storage environment of the virtual machine by identifying, from the host system, a virtual disk file that stores data for the virtual machine and identifying, from a guest system operating within the virtual machine, a virtual storage device that stores data for the virtual machine. Exemplary system 100 may also include a backup module 108 that may create a unified backup of the virtual machine based on the storage map of the virtual storage environment by coordinating a backup operation of the virtual disk file with a backup operation of the virtual storage device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or host 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
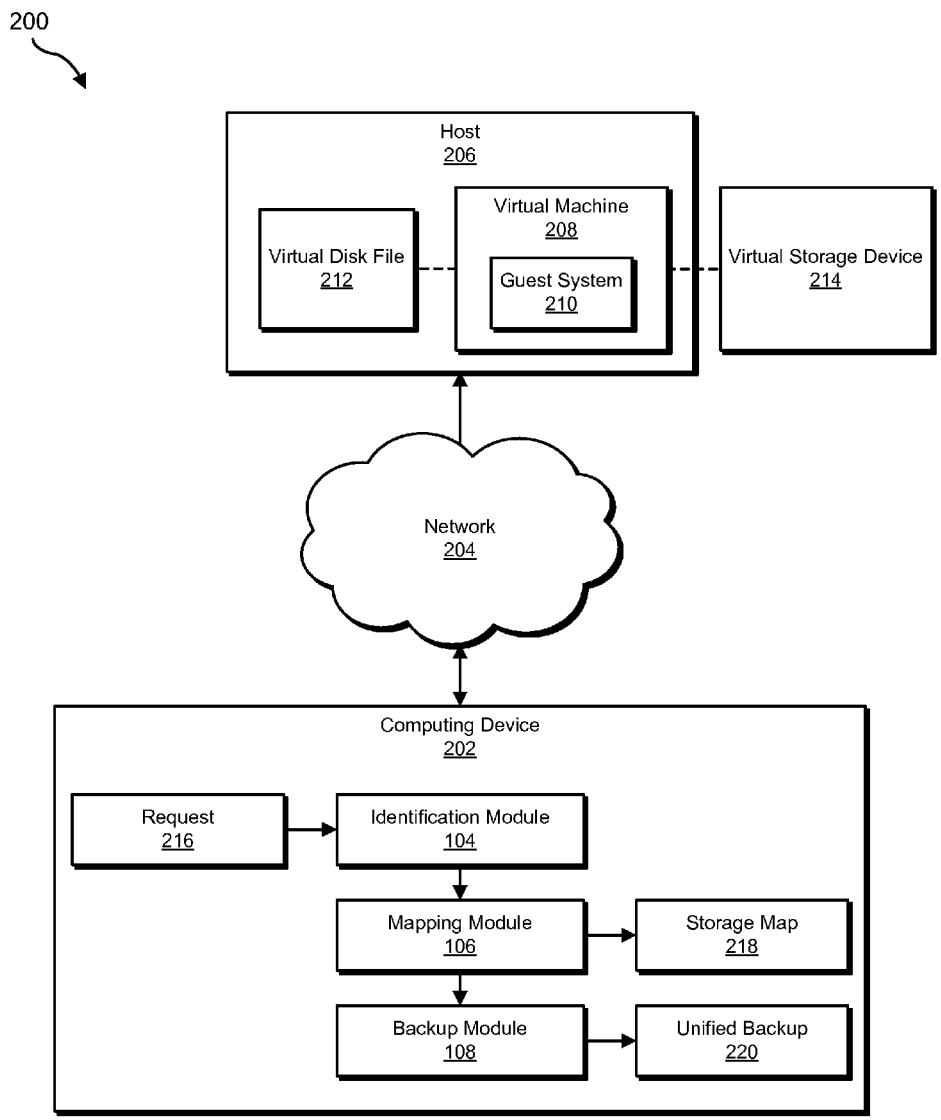
FIG. 2 is a block diagram of an additional exemplary system for backing up heterogeneous virtual environments.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a host 206 via a network 204. In one example, computing device 202 may be programmed with one or more of modules 102. Additionally or alternatively, host 206 may be programmed with one or more of modules 102.

In one embodiment, one or more of modules 102 from FIG. 1 may, when executed by at least one processor of computing device 202 and/or host 206, enable computing device 202 and/or host 206 to create a unified backup of a heterogeneous virtual environment. For example, and as will be described in greater detail below, identification module 104 may identify a request 216 to back up a virtual machine 208 executing on host system 206. Mapping module 106 may create a storage map 218 of a virtual storage environment of virtual machine 208 by identifying, from host system 206, a virtual disk file 212 that stores data for virtual machine 208 and by identifying, from a guest system 210 operating within virtual machine 208, a virtual storage device 214 that stores data for virtual machine 208. Backup module 108 may create a unified backup 220 of virtual machine 208 based on storage map 218 of the virtual storage environment by coordinating a backup operation of virtual disk file 212 with a backup operation of virtual storage device 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Host 206 generally represents any type or form of computing device that is capable of hosting one or more virtual machines, storing data as files, and/or receiving, storing, and/or providing data. Examples of host 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and host 206.

Figure 3:
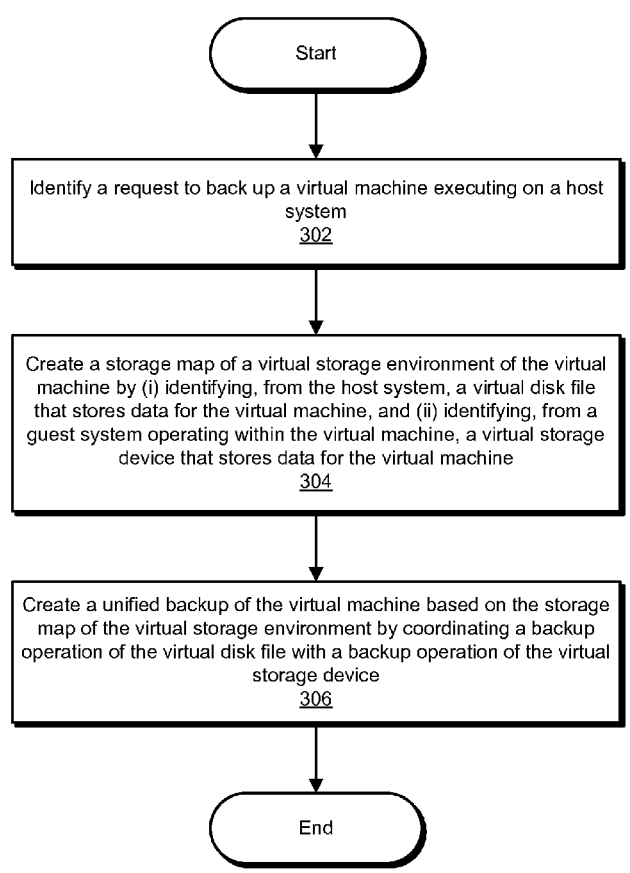
FIG. 3 is a flow diagram of an exemplary method for backing up heterogeneous virtual environments.

FIG. 3 is a flow diagram of an exemplary computer-implemented method 300 for backing up heterogeneous virtual environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a request to back up a virtual machine executing on a host system. For example, at step 302 identification module 104 may, as part of computing device 202 in FIG. 2, identify request 216 to back up virtual machine 208 executing on host system 206.

Virtual machine 208 may include part of a heterogeneous virtual environment that includes virtual disk file 212 and virtual storage device 214.

The phrase "host system," as used herein, generally refers to a computing system capable of hosting, managing, and/or executing one or more virtual machines. In some examples, the phrase "host system" may refer to a hypervisor, a virtual machine monitor, and/or a virtual machine manager. For example, the host system may include a Type 1 hypervisor, such as VMWARE ESX/ESXI, CITRIX XENSERVER, and MICROSOFT HYPER-V, which may interface directly with hardware. In another example, the host system may include a Type 2 hypervisor, such as SUN VIRTUALBOX, VMWARE SERVER, and MICROSOFT VIRTUAL PC, which may interface with an underlying operating system.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications. In addition, the phrase "guest system," as used herein, may refer to any system (e.g., an operating system) running within a virtualized environment, such as a virtual machine. A guest operating system may include any suitable operating system, such as MICROSOFT WINDOWS, UNIX, and/or LINUX. In some examples, the phrase "guest system" may refer to an agent operating within a virtual machine (e.g., a backup agent) and/or a system operating within a virtual machine that can host and/or communicate with an agent operating within the virtual machine.

Identification module 104 may identify a request to back up a virtual machine in any suitable context. For example, a backup system running on the host or a separate backup server may initiate a backup of a virtual machine and its associated data stores, for example. Backups may be made as part of a regular backup schedule or initiated by a user. A backup may also be triggered in response to an event on the host or virtual machine, such part of a shutdown process for the virtual machine. In some examples, identification module 104 may identify a request to back up a host system (e.g., that includes multiple virtual machines). In this example, identification module 104 may determine that the request to back up the host system entails a request to back up each virtual machine hosted by the host system.

Returning to FIG. 3, at step 304 one or more of the systems described herein may create a storage map of a virtual storage environment of the virtual machine. For example, at step 304 mapping module 106 may, as part of computing device 202 in FIG. 2, create storage map 218 of a virtual storage environment of virtual machine 208, in part by identifying, from host system 206, virtual disk file 212 that stores data for virtual machine 208.

The term "virtual storage environment," as used herein, generally refers to the set of virtual storage devices and/or data storage resources that may be used by a virtual machine. An example of a simple virtual storage environment may consist of a single virtual disk file that stores a representation of a virtual disk for a virtual machine. More complex examples may include a heterogeneous mix of shared virtual disk files, storage area networks, application data stores, etc. Accordingly, the term "storage map," as used herein, may refer to any representation of a virtual storage environment. For example, the storage map may denote one or more relationships between a virtual machine and one or more storage resources used by the virtual machine. Additionally or alternatively, the storage map may indicate whether the virtual storage environment of a virtual machine is heterogeneous (e.g., whether the virtual storage environment of the virtual machine simultaneously includes one or more storage resources that are to be backed up from the host system and one or more storage resources that are to be backed up from the guest system within the virtual machine).

The term "virtual disk file," as used herein, generally refers to a file in a disk image file format that represents the contents of a disk accessible to a virtual machine. In some examples, the virtual disk file may include the operating system data and/or primary data store for a virtual machine. For example, a host machine may boot a virtual machine from a virtual disk file. Each virtual disk file may be stored as one or more files on a physical storage device in a file format specific to the virtual machine vendor. For example, VMWARE WORKSTATION virtual machines may use the VMDK file format. MICROSOFT HYPER-V may use the VHD file format.

Mapping module 106 may identify the virtual disk file from the host system in a variety of ways. For example, mapping module 106 may identify all virtual machines running on the host system by locating the file system directory used by the host system to store virtual disk files. Additionally or alternatively, mapping module 106 may identify the virtual disk file by querying the host system (e.g., querying a hypervisor using an application programming interface) about the virtual machine. If not all virtual machines running on a host are to be backed up (for example, if a backup server indicates that a virtual storage environment that includes only a subset of the virtual machines running on a host are to be backed up), mapping module 106 may identify the virtual hard disk files corresponding to only virtual machines that are to be backed up.

Figure 4:
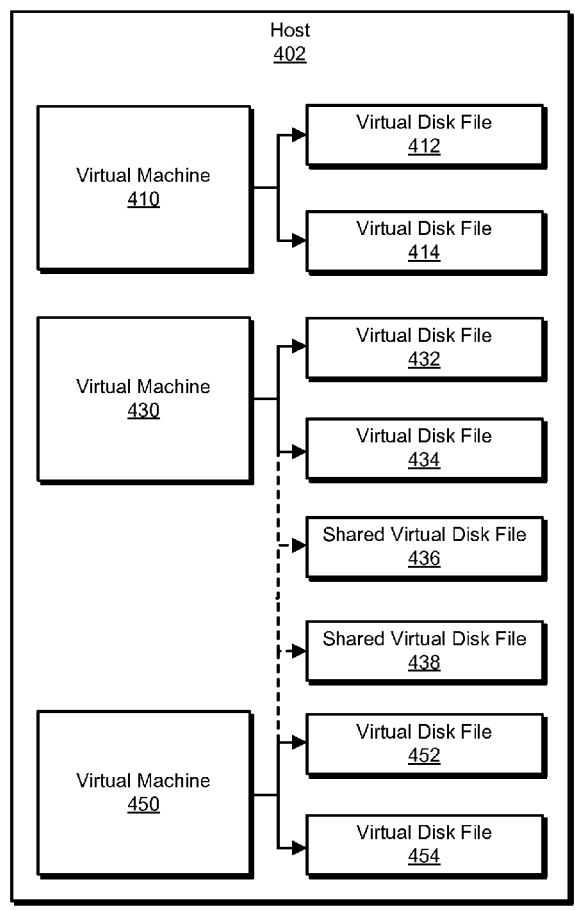
FIG. 4 is a block diagram of a host view of an exemplary system for backing up heterogeneous virtual environments.

FIG. 4 is a block diagram of a host view of an exemplary system 400 for backing up heterogeneous virtual environments. FIG. 4 shows the relationship between virtual machines and virtual disk files, as seen from the point of view of a host. As illustrated in this figure, exemplary system 400 may include several virtual machines, 410, 430, and 450 executing on host 402. Each virtual machine may include one or more virtual disk files. Virtual machine 410 includes two virtual disk files, 412 and 414. Virtual machines 430 includes virtual disk files 432 and 434 and shared virtual disk files 436 and 438. Virtual machine 450 also includes shared virtual disk files 436 and 438, and also includes virtual disk files 452 and 454. In one example, mapping module 106 may determine that virtual machines 430 and 450 share virtual disk files (e.g., shared virtual disk files 436 and 438). As will be explained in greater detail below, the systems described herein may accordingly determine that virtual machines 430 and 450 are to be backed up at least in part via agents operating within the respective guest systems of virtual machines 430 and 450.

Returning to step 304 of FIG. 3, one or more of the systems described herein may also identify, from a guest system operating within the virtual machine, a virtual storage device that stores data for the virtual machine. For example, at step 304 mapping module 106 may, as part of computing device 202 in FIG. 2, identify, from guest system 210 operating within virtual machine 208, virtual storage device 214 that stores data for virtual machine 208. Identifying virtual storage device 214 may be part of the procedure mapping module 106 uses to map the virtual storage environment used by virtual machine 208.

The phrase "virtual storage device," as used herein, generally refers to a software abstraction of a physical storage device (e.g. an abstraction of a hard disk). A virtual storage device may map to physical storage capacity it represents. Virtual storage devices and systems may emulate physical hard disks by including a meta-data mapping table that translates the incoming virtual disk identifier and virtual LBA (Logical Block Addressing) to a physical disk identifier and physical LBA. In some examples, a virtual storage device may map to multiple physical devices in a variety of configurations, along with software systems for managing and interfacing with the devices.

A virtual storage device may take a variety of forms. In various embodiments, the virtual storage device may include (1) a shared virtual disk file, (2) a pass-through data store, (3) an independent disk, (4) a storage area network, (5) a virtual server cluster, and/or (6) a virtual application data store. In some embodiments, the storage area network may include (1) a data store on a Fibre Channel network and/or (2) a data store on a logical Internet Small Computer System Interface device. The term "Fibre Channel," as used herein, generally refers to a high-speed network standard, primarily used to connect computers to storage area networks. The Fibre Channel standard includes a programming interface for connecting computers to data storage via a Fibre Channel network and a transport protocol for sending disk commands. The term "Internet Small Computer System Interface" (or "iSCSI"), as used herein, generally refers to an internet protocol (IP)-based storage networking standard for linking data storage facilities. iSCSI may be used to transmit data and disk commands using the common SCSI interface protocol over networks, including the Internet. Unlike Fibre Channel, iSCSI does not require special-purpose cabling.

In some embodiment, the virtual storage device cannot be identified as pertaining to the virtual machine independently of the guest system. Because a virtual machine may operate as an independent computing system, there may be no expectation or mechanism for the virtual machine to inform the host of storage devices accessed during the virtual machine's operation. In some embodiments, identifying the virtual storage device as pertaining to the virtual machine from the host system may be impractical and/or otherwise undesirable. For example, determining, from the host system, which storage devices a virtual machine is using may require an undesirable degree of monitoring and analysis of the virtual machine's network usage.

Mapping module 106 may identify a virtual storage device from a guest system within the virtual machine in a variety of ways. In some examples, identifying the virtual storage device that stores data for the virtual machine may include (1) discovering the hostname of the virtual machine, (2) using the hostname to connect to the guest system operating within the virtual machine, and (3) querying the guest system to identify the virtual storage device. As depicted in FIG. 2, mapping module 106 may identify the hostname of virtual machine 208 (e.g., by consulting a registry entry).

The term "hostname," as used herein, generally refers to a name used to locate and connect to a virtual machine in a network. For example, mapping module 106 may use the hostname of virtual machine 208 to connect to guest system 210 running on virtual machine 208.

In some examples, once mapping module 106 has discovered the hostname of the virtual machine, mapping module 106 may use the hostname to connect to a backup agent or other guest system executing on the virtual machine. In these examples, mapping module 106 may then use application programming interfaces provided by the guest system to query the guest system to identify any virtual storage devices used by the virtual machine.

In some examples, identifying the virtual storage device that stores data for the virtual machine may include (1) discovering the hostname of the virtual machine and (2) using the hostname to query a virtual machine management interface to identify the virtual storage device. The term "virtual management interface" as used herein, generally refers to network management utilities or application programming interfaces (APIs) that enable an administrator to query network devices to obtain network configuration information. Virtual management interfaces typically conform to the Common Information Module (CIM), published by the Distributed Management Task Force (DMTF). In MICROSOFT WINDOWS-based systems, devices use the WINDOWS Management Instrumentation (WMI) implementation of the CIM standard to instrument devices to be managed using compatible software. For example, mapping module 106 may query a virtual management interface to identify virtual storage device 214, which virtual machine 208 uses to store data.

Figure 5:
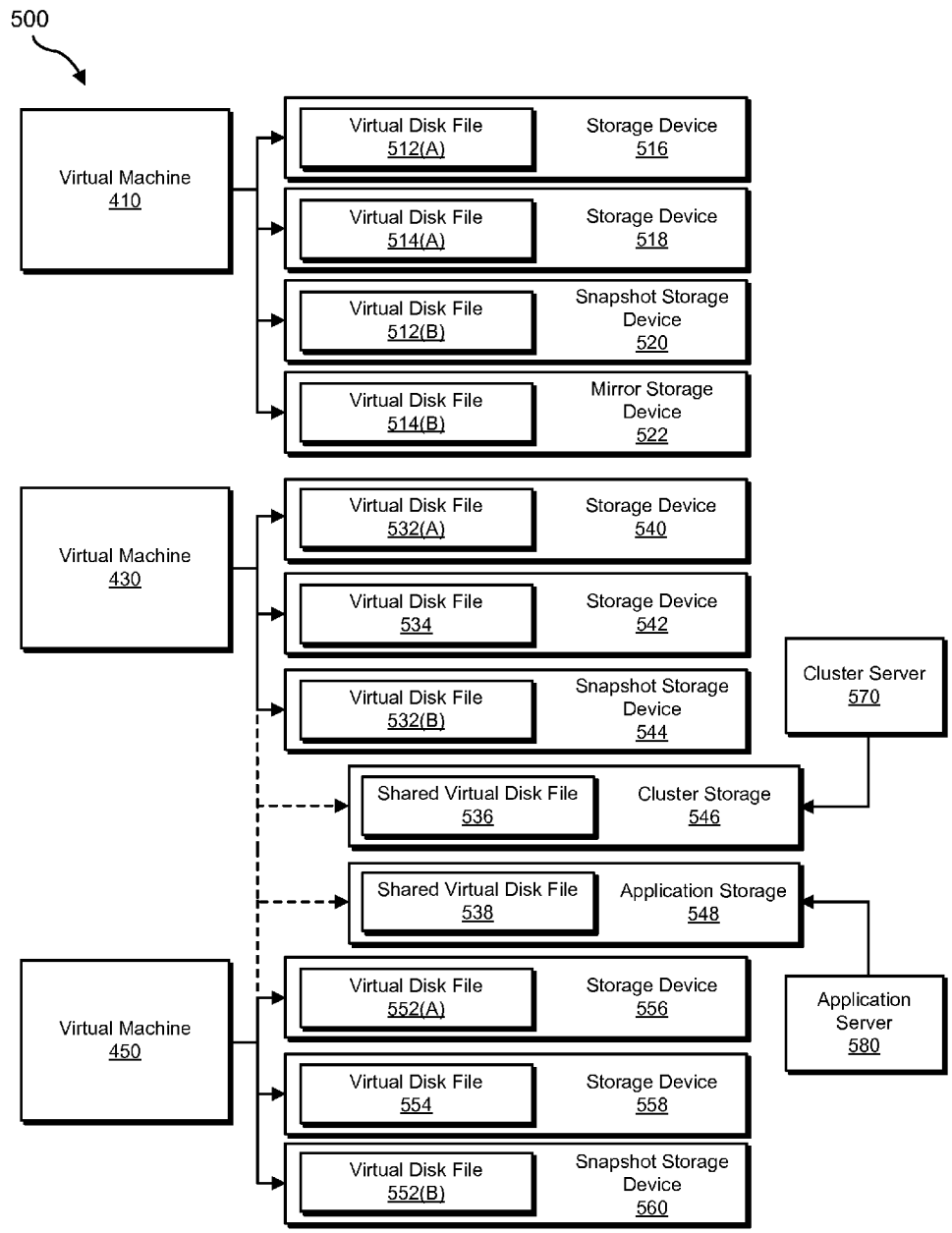
FIG. 5 is a block diagram of a guest view of an exemplary system for backing up heterogeneous virtual environments.

FIG. 5 is a block diagram of a guest view of an exemplary system 500 for backing up heterogeneous virtual environments. Compared to the host view of the same virtual environment shown in FIG. 4, the guest view illustrates the potential complexity of a heterogeneous virtual storage environment. As shown in FIG. 5, exemplary system 500 may include several virtual machines 410, 430, and 450. As shown, virtual machine 410 may connect to virtual disk files 512(A) and 514(A) stored on storage devices 516 and 518, respectively. Virtual machine 410 may also connect to snapshot storage device 520 that may store in virtual disk file 512(B) one or more snapshot backups of virtual disk file 512(A). In addition, virtual machine 410 may connect to mirror storage device 522 that may store a virtual disk file 514(B).

Virtual machine 430 in exemplary system 500 may connect to storage devices 540 and 542 that store virtual disk files 532(A) and 534, respectively. Virtual machine 430 may also connect to snapshot storage device 544 that may store in virtual disk file 532(B) one or more snapshot backups of virtual disk file 532(A). As depicted, virtual machine 430 and virtual machine 450 share two virtual disk files. Shared virtual disk file 536 may be stored in cluster storage 546, which may be administered by cluster server 570. Shared virtual disk 538 may be used an application storage volume 548 for application server 580. In addition to the shared virtual disks 536 and 538 shared with virtual machine 430, virtual machine 450 may connect to two virtual disk files 552(A) and 554 on storage devices 556 and 558, respectively, and virtual disk file 552(B) on snapshot storage device 560.

Returning to FIG. 3, at step 306 one or more of the systems described herein may create a unified backup of the virtual machine based on the storage map of the virtual storage environment by coordinating a backup operation of the virtual disk file with a backup operation of the virtual storage device. For example, at step 306 backup module 108 may, as part of computing device 202 in FIG. 2, create unified backup 220 of virtual machine 208 based on storage map 218 of the virtual storage environment by coordinating a backup operation of virtual disk file 212 with a backup operation of virtual storage device 214.

Backup module 108 may create a unified backup of the virtual machine in a variety of ways. For example, in one embodiment, the backup operation of the virtual disk file may include (1) snapshotting the virtual disk file, (2) copying the virtual disk file, and/or (3) creating a device image of the storage device containing the virtual disk file. As used herein, the term "snapshot" may refer to any representation of a volume of data and/or a portion of a volume of data at a certain point in time. For example, a snapshot may be made of virtual disk file 212 at a point in time to capture the state of virtual machine 208, which is based on virtual disk file 212. Snapshot systems may include storage devices and volume managers optimized for representing an entire volume of data at a point in time (e.g., by performing copy-on-write operations to preserve all of the data within the volume at a point in time with requiring an immediate copy of the entire volume of data). Snapshotting may be used as part of a backup system—the snapshot system may create a snapshot of a volume, which may then be backed up to a separate storage device. In this way, a high-availability system may be backed up while meeting a service level agreement and/or other objective for minimizing downtime.

In some examples, backing up the virtual storage device may include (1) using the virtual machine hostname to connect to the guest system operating within the virtual machine and (2) directing the guest system to back up the virtual storage device. Backup module 108 may use the virtual machine hostname obtained by mapping module 106 when it created the storage map backup module 108 uses to create the unified backup.

In some examples, backing up the virtual storage device may include (1) identifying a maximum backup time difference objective to maintain data consistency between a backup of the virtual disk file and a backup of the virtual storage device and (2) backing up the virtual disk file and the virtual storage device within the maximum backup time difference objective. Depending on the relationships between data stored on the virtual disk file and the virtual storage device, and how often data on the two devices changes, data inconsistencies may arise when the two devices are not backed up at the same time, or steps are not taken to assure that data on the two devices does not change during the course of a backup.

The term "data consistency," as used herein, generally refers to the validity, usability, and integrity of related data across a data storage environment. Database systems may be designed to maintain data consistency within a single database, but maintaining data consistency across file systems on separate storage devices may present additional challenges. For example, virtual machine 208 may store data in virtual disk file 212 that references a file or data stored on virtual storage device 214. If virtual disk file 212 and virtual storage device 214 are not backed up at the same time, or if steps are not take to assure that data on the two devices does not change during the backup operation, virtual disk file 212 may reference data that has not yet been written to virtual storage device 214, or which no longer exists. Steps taken to maintain data consistency may depend partly on the nature of the data—the relationships between data stored on separate storage devices and how often the data changes. Some of the steps that may be taken to assure data consistency include snapshotting, buffering volume writes, blocking write access to data during the backup process, and committing all pending writes to the devices before initiating a backup operation.

In some examples, backup module 108 may create the unified backup of the virtual machine by creating a point-in-time backup of the virtual machine. For example, backup module 108 may (1) create a backup of the virtual disk file at a point in time, (2) create a backup of the virtual storage device at the point in time, and (3) associate the backup of the virtual disk file with the backup of the virtual storage device under the unified backup. For example, backup module 108 may coordinate the timing of backup operations between an agent operating within the guest system of the virtual machine and a backup system operating from the perspective of the host system.

As explained above, the systems and methods described herein may automatically and fully back up a heterogeneous virtual storage environment by mapping the various data stores used by each of the virtual machines within the virtual storage environment, including both the virtual disk file(s) that comprise each virtual machine, and the various data stores used by the virtual machine. The systems and methods described herein may then perform a unified backup by coordinating the backup of the virtual disk file(s) and the heterogeneous data stores, according to the storage map. The unified backup may include resources unknown to the host, and which therefore may not be snapshotted or otherwise backed up from the host in conjunction with backing up the virtual machine's virtual disk file. In some examples, these systems and methods may enable an administrator to specify a host system as a backup target and thereby automatically back up all virtual machines hosted by the host system, including, e.g., storage resources that would otherwise not be seen and/or properly identified from the host system.

Figure 6:
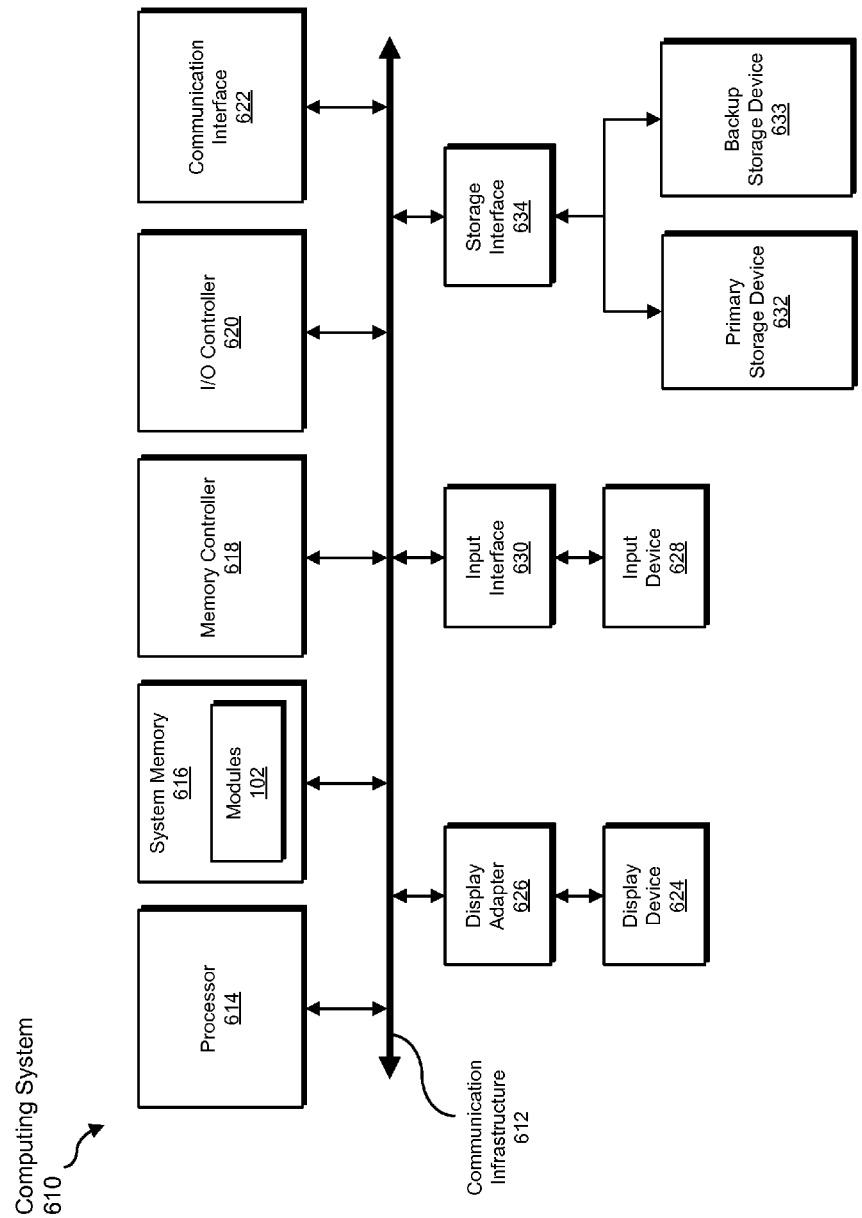
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
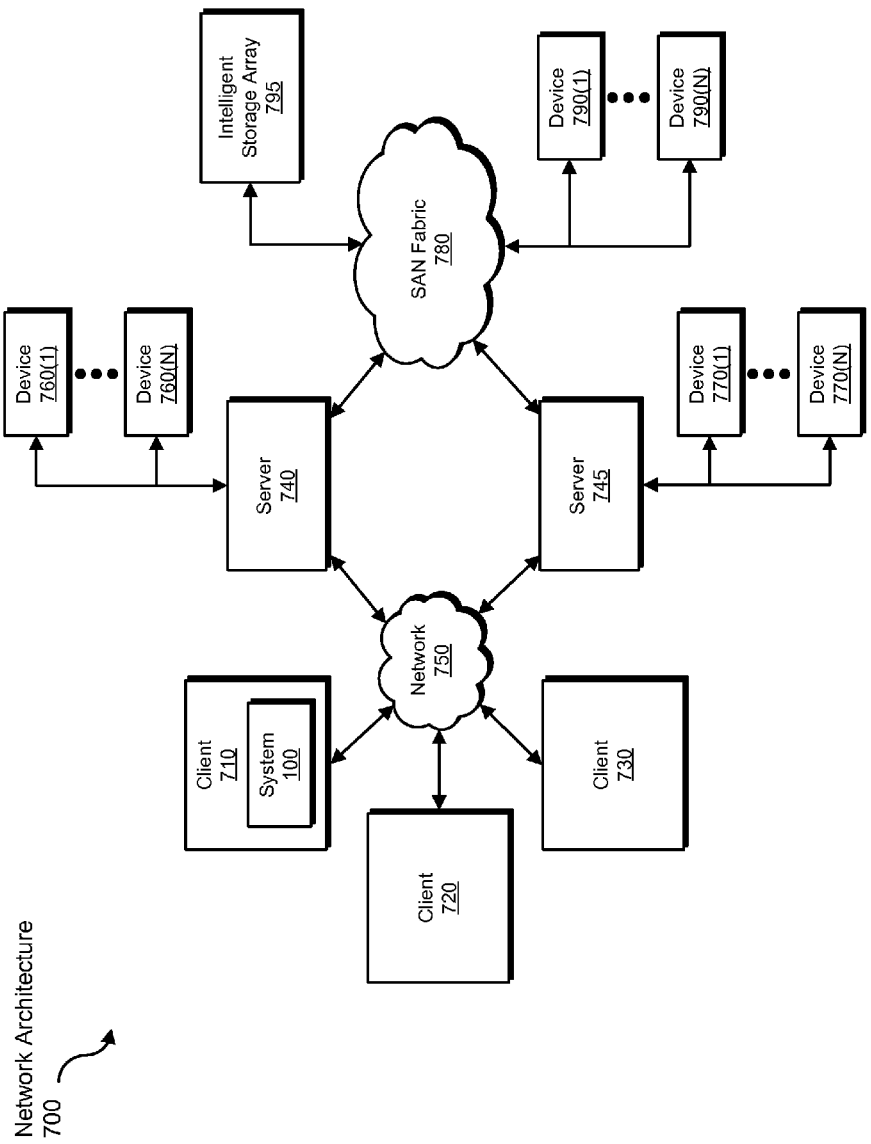
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for backing up heterogeneous virtual environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, output a result of the transformation to create a storage map of a virtual environment, use the result of the transformation to create a unified backup of the virtual environment. One or more of the modules recited herein may also transform a computing system into a system for backing up a heterogeneous virtual environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for backing up heterogeneous virtual environments, at least a portion of the method being performed by a computing device comprising at least one processor, the method comprising: identifying a request to back up a virtual machine executing on a host system; creating a storage map of a virtual storage environment of the virtual machine by: identifying, from the host system, a virtual disk file that stores data for the virtual machine; and identifying, from a guest system operating within the virtual machine, a virtual storage device that stores, outside the virtual disk file and off the host system, data for the virtual machine; and creating a unified backup of the virtual machine based on the storage map of the virtual storage environment by coordinating a timing of a backup operation of the virtual disk file with a timing of a backup operation of data stored within the virtual storage device by: identifying a maximum backup time difference objective to maintain data consistency between a backup of the virtual disk file and a backup of the virtual storage device, the maximum backup time difference objective being based at least in part on a data change frequency on the virtual storage device; creating a backup of the virtual disk file at a point in time; creating a backup of the virtual storage device in proximity to the point in time to meet the maximum backup time difference objective; and associating the backup of the virtual disk file with the backup of the virtual storage device.

2. The computer-implemented method of claim 1, wherein the virtual storage device cannot be identified as pertaining to the virtual machine independently of the guest system.

3. The computer-implemented method of claim 1, wherein the virtual storage device comprises at least one of: a shared virtual disk file; a pass-through data store; an independent disk; a storage area network; a virtual server cluster; a virtual application data store.

4. The computer-implemented method of claim 3, wherein the storage area network comprises at least one of: a data store on a Fibre Channel network; a data store on a logical Internet Small Computer System Interface device.

5. The computer-implemented method of claim 1, wherein identifying the virtual storage device that stores data for the virtual machine comprises: discovering the hostname of the virtual machine; using the hostname to connect to the guest system operating within the virtual machine; querying the guest system to identify the virtual storage device.

6. The computer-implemented method of claim 1, wherein identifying the virtual storage device that stores data for the virtual machine comprises: discovering the hostname of the virtual machine; using the hostname to query a virtual machine management interface to identify the virtual storage device.

7. The computer-implemented method of claim 1, wherein the backup operation of the virtual disk file comprises at least one of: snapshotting the virtual disk file; copying the virtual disk file; creating a device image of the storage device containing the virtual disk file.

8. The computer-implemented method of claim 1, wherein backing up the virtual storage device comprises: using the virtual machine hostname to connect to the guest system operating within the virtual machine; directing the guest system to back up the virtual storage device.

9. The computer-implemented method of claim 1, wherein creating the unified backup of the virtual machine comprises creating a point-in-time backup of the virtual machine by: creating a backup of the virtual disk file at a point in time; creating a backup of the virtual storage device at the point in time; associating the backup of the virtual disk file with the backup of the virtual storage device under the unified backup.

10. A system for backing up heterogeneous virtual environments, the system comprising: an identification module, stored in memory, that identifies a request to back up a virtual machine executing on a host system; a mapping module, stored in memory, that creates a storage map of a virtual storage environment of the virtual machine by: identifying, from the host system, a virtual disk file that stores data for the virtual machine; and identifying, from a guest system operating within the virtual machine, a virtual storage device that stores, outside the virtual disk file and off the host system, data for the virtual machine outside the virtual disk file; a backup module, stored in memory, that creates a unified backup of the virtual machine based on the storage map of the virtual storage environment by coordinating a timing of backup operation of the virtual disk file with a timing of backup operation of data stored within the virtual storage device by: identifying a maximum backup time difference objective to maintain data consistency between a backup of the virtual disk file and a backup of the virtual storage device, the maximum backup time difference objective being based at least in part on a data change frequency on the virtual storage device; creating a backup of the virtual disk file at a point in time; creating a backup of the virtual storage device in proximity to the point in time to meet the maximum backup time difference objective; and associating the backup of the virtual disk file with the backup of the virtual storage device; and at least one physical processor that executes the identification module, the mapping module, and the backup module.

11. The system of claim 10, wherein the virtual storage device cannot be identified as pertaining to the virtual machine independently of the guest system.

12. The system of claim 10, wherein the virtual storage device comprises at least one of: a shared virtual disk file; a pass-through data store; an independent disk; a storage area network; a virtual server cluster; a virtual application data store.

13. The system of claim 12, wherein the storage area network comprises at least one of: a data store on a Fibre Channel network; a data store on a logical Internet Small Computer System Interface device.

14. The system of claim 10, wherein the identification module identifies the virtual storage device that stores data for the virtual machine by: discovering the hostname of the virtual machine; using the hostname to connect to the guest system operating within the virtual machine; querying the guest system to identify the virtual storage device.

15. The system of claim 10, wherein the identification module identifies the virtual storage device that stores data for the virtual machine by: discovering the hostname of the virtual machine; using the hostname to query a virtual machine management interface to identify the virtual storage device.

16. The system of claim 10, wherein the backup operation of the virtual disk file comprises at least one of: snapshotting the virtual disk file; copying the virtual disk file; creating a device image of the storage device containing the virtual disk file.

17. The system of claim 10, wherein the backup module backs up the virtual storage device by: using the virtual machine hostname to connect to the guest system operating within the virtual machine; directing the guest system to back up the virtual storage device.

18. A non-transitory computer-readable medium comprising one or more computer-readable instructions that, when executed by at least one processor of a computing device, cause the computing device to: identify a request to back up a virtual machine executing on a host system; create a storage map of a virtual storage environment of the virtual machine by: identifying, from the host system, a virtual disk file that stores data for the virtual machine; and identifying, from a guest system operating within the virtual machine, a virtual storage device that stores, outside the virtual disk file and off the host system, data for the virtual machine; and create a unified backup of the virtual machine based on the storage map of the virtual storage environment by coordinating a timing of backup operation of the virtual disk file with a timing of backup operation of data stored within the virtual storage device by: identifying a maximum backup time difference objective to maintain data consistency between a backup of the virtual disk file and a backup of the virtual storage device, the maximum backup time difference objective being based at least in part on a data change frequency on the virtual storage device; creating a backup of the virtual disk file at a point in time; creating a backup of the virtual storage device in proximity to the point in time to meet the maximum backup time difference objective; and associating the backup of the virtual disk file with the backup of the virtual storage device.

* * * * *